United States Patent

[11] 3,559,766

| [72] | Inventor | William Rosse Heslop |
| | | Atherton, Calif. |
| [21] | Appl. No. | 790,892 |
| [22] | Filed | Oct. 30, 1968 |
| [45] | Patented | Feb. 2, 1971 |
| [73] | Assignee | Raychem Corporation |
| | | Menlo Park, Calif. |
| | | a corporation of California |
| | | Continuation-in-part of application Ser. No. 591,836, Nov. 3, 1966, now abandoned. |

[54] HEAT RECOVERABLE ARTICLE WITH MECHANICAL INSERT
4 Claims, 2 Drawing Figs.

| [52] | U.S. Cl. | 185/39, 60/7; 174/84; 279/46; 339/98 |
| [51] | Int. Cl. | F03g 1/00 |
| [50] | Field of Search | 185/39; 11/40 TOYS; 60/7, 10, 23, Parent Case Inspected; 339/(Inquired); 174/(Inquired); 279/(Inquired); 284/(Inquired) |

[56] References Cited
UNITED STATES PATENTS

| 1,515,860 | 11/1924 | Howard | 339/201 |
| 2,534,881 | 12/1950 | Schroeder | 339/97 |
| 2,715,714 | 8/1955 | Pavlinetz | 339/213 |
| 3,320,355 | 5/1967 | Booker | 174/84 |

FOREIGN PATENTS

| 469,448 | 7/1937 | Great Britain | 339/201 |

*Primary Examiner*—Edgar W. Geoghegan
*Attorney*—Lyon & Lyon

ABSTRACT: Heat recoverable articles adapted to operate upon an object in which a heat recoverable sleeve is disposed about spiral spring means inserted in and substantially coaxial with said sleeve, recovery of the sleeve causing contraction of the spring means and transmission of the force exerted by recovery to a member engageable with the inner end of said spring means.

PATENTED FEB 2 1971

3,559,766

INVENTOR.
WILLIAM ROSSE HESLOP
BY
*Lyon & Lyon*
ATTORNEY'S

HEAT RECOVERABLE ARTICLE WITH MECHANICAL INSERT

This application is a continuation-in-part of my copending application Ser. No. 591,836 which was filed on Nov. 3, 1966, now abandoned and entitled "Heat Recoverable Article With Mechanical Insert."

This invention relates to heat recoverable articles and more particularly relates to such articles that are provided with mechanical inserts which provide a mechanical advantage.

In general, such heat recoverable articles are made of a material capable of having the property of plastic or elastic memory imparted thereto and are expanded under heat and pressure to a diameter greater than their normal diameter and cooled while under pressure. A sleeve treated in this manner will retain its expanded position until it is again heated to at least its heat recovery temperature at which time it will recover to its original shape. Examples of material useful in forming such dimensionally heat unstable recoverable members may be found in Currie U.S. Pat. No. 2,027,962 and Cook et al. Pat. No. 3,086,242, the disclosures of which are incorporated herein by reference. Polymeric materials which have been crosslinked by chemical means or by irradiation, for example, with high energy electrons or nuclear radiation, such as those disclosed in the Cook et al. patent are preferred for use in the present invention. Noncrystalline polymeric materials exhibiting the property of plastic or elastic memory, such as polyurethane, ionomers, etc., could also be used in practicing the present invention. Sleeves made from materials having either plastic or elastic memory are equally useful in the devices of the present invention; consequently, as used herein, the terms "elastic memory" and "plastic memory" are used interchangeably and are intended to be mutually inclusive.

Alternatively, metals having the property of heat recoverability may be used in place of or in combination with the foregoing heat recoverable organic materials. Suitable heat recoverable materials for use in this invention are described in Muldawer et al. U.S. Pat. No. 3,012,882 and Buehler et al. U.S. Pat. No. 3,174,851, and Buehler et al. "Martensitic Transformations in the TiNi Compound," a paper given at the Fifth International Symposium on the reactivity of solids, Munich, Germany, Aug. 5—8, 1964, reprinted in Reactivity of Solids, pp. 79—90 (Elsevier Publishing Company, Amsterdam, 1965), the disclosures of which are incorporated by reference herein.

It has been found that articles embodying such independently dimensionally unstable sleeves can be designed such that the inwardly radial forces generated by recovery are transmitted to and act upon objects in a useful fashion. For example, articles have been provided wherein the inward forces of recovery can be converted to, e.g., rotational forces or forces perpendicular to the inward force of recovery. This is achieved by the provision of a mechanical insert within the sleeve. The broad concept of providing such a mechanical insert is not my invention, but is the invention of Judson Douglas Wetmore. This broad concept and various specific structural embodiments of it are disclosed and claimed in his application Ser. No. 771,810, filed Oct. 30, 1968, the disclosure of which is incorporated herein by reference. Mechanical inserts constructed in accordance with the present invention transmit the recovery forces of the sleeve to the object or objects to be operated on in such a manner that these transmitted forces are exerted in a direction other than the direction of movement of the sleeve as it recovers. Such forces, for example, can be exerted perpendicularly to the recovery forces or can be rotational in nature.

As used herein, the term "mechanical advantage" as applied to a mechanical insert according to the present invention is not meant to imply that the insert necessarily has a mechanical advantage greater than unity, that is, that the load force is greater than the applied force. Rather, this term is also meant to include those inserts in which the mechanical advantage is less than unity, that is, those in which the load force is less than the applied force but moves through a greater distance, and those inserts in which the resulting load movement is different either in direction or magnitude, from that of the applied movement.

It is therefore an object of the present invention to provide a recoverable article having a mechanical insert therein.

It is also an object of the present invention to provide such an article in which the mechanical insert has a mechanical advantage and is acted upon by the recovery force of a recoverable member.

It is another object of the present invention to provide an article including a recoverable member with a mechanical insert which multiplies the forces exerted by the recoverable member or the distance moved by the member upon the recovery thereof.

It is yet another object of the present invention to provide an article including a recoverable member and a mechanical insert for exerting a force on an object in a direction other than the direction of the recovery forces of said member.

These and other objects and advantages of the present invention will become more apparent upon reference to the accompanying description and drawings in which:

BRIEF DESCRIPTION OF THE DRAWINGS

Turning now to FIG. 1, there is shown a first article constructed in accordance with the present invention. In this article, a recoverable sleeve 1 is provided with a mechanical insert 2 in the form of a spiral spring whose outer periphery is engaged by the sleeve. A rod 3 is fastened to the innermost leaf of the spring and the rod 3 is provided with an actuating means 4. When the sleeve 1 is caused to recover, the spring 2 is wound up or contracted with the result that the rod 3 and the actuator 4 are caused to rotate, the movement of the rod being considerably greater than the movement of the outer leaves of the spring. This rotating motion could be used to actuate an alarm or could be used, for example, to screw on and insulate a cap at the same time. In the latter case the sleeve 1 would be made to extend over the object to be capped so that it would engage and insulate it upon recovery. With reference to FIG. 2, wherein the shaft 5 is tapered, the recovery of the sleeve 6 and the winding up of the spring 7 will cause the shaft 5 to move outwardly. This outward movement could be used to close a switch or perform any other desired function.

Figure 1:
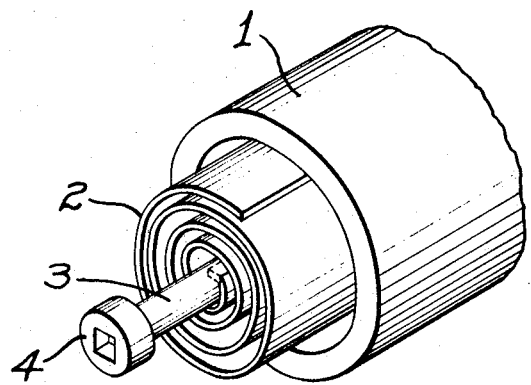
FIG. 1 is a partial oblique view of a first article constructed in accordance with the present invention before recovery of the recoverable member.
Figure 2:
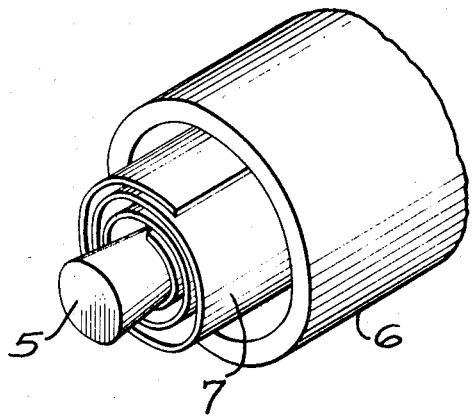
FIG. 2 is a partial oblique view of a second article constructed in accordance with the present invention before recovery of the recoverable member.

From the foregoing description, it can be seen that apparatus has been provided for multiplying and/or converting the forces exerted by the recovery of a heat recoverable member into a greater force or into a force exerted in directions other than the direction of recovery of the recoverable member. This is accomplished by the provision of simple mechanical inserts having a mechanical advantage within the recoverable member. The apparatus thus provided may be used to make simple and quick mechanical and/or electrical connections, operate switches and perform many other useful functions.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A recoverable article adapted to operate on an object, comprising a sleeve of material which has been dimensionally changed from an original heat stable form to an independently dimensionally unstable material capable of moving in the direction of its original form upon the application of heat alone, and mechanical means having a mechanical advantage inserted in said sleeve, said means comprising spiral spring means substantially coaxial with said sleeve and member engageable by the inner end of said spring means and movable as the result of contraction of said spring means, said sleeve engaging the outer periphery of said spring means and upon heat recovery acting on said spring means to cause the contraction thereof and the transmission to said member of the force exerted by the heat recovery of said sleeve.

2. The article of claim 1 wherein said sleeve comprises a metal.

3. The article of claim 1 wherein said member is fixedly attached to the inner end of said spring means whereby contraction of said spring means causes rotational movement of said member.

4. The article of claim 1 wherein said member is tapered and inserted into said spring means whereby contraction of said spring means causes said member to move outwardly of said spring means.